United States Patent [19]

Nory et al.

[11] 4,395,121

[45] Jul. 26, 1983

[54] APPARATUS FOR DETERMINING THE ANGULAR POSITION OF A TARGET ILLUMINATED BY LIGHT PULSES

[75] Inventors: Pierre Nory, Orsay; Guy Ripart, Le-Plessis-Robinson, both of France

[73] Assignee: Societe Anonyme dite: Compagnie Industrielle des Lasers, Marcoussis, France

[21] Appl. No.: 236,347

[22] Filed: Feb. 20, 1981

[30] Foreign Application Priority Data

Feb. 20, 1980 [FR] France ............................ 80 03676

[51] Int. Cl.³ .......................... G01B 11/26; G01J 1/20
[52] U.S. Cl. .................................. 356/152; 250/203 R; 250/227
[58] Field of Search .................. 250/227, 203 R; 356/141, 152; 455/603, 604, 617, 619

[56] References Cited

U.S. PATENT DOCUMENTS

| | | | |
|---|---|---|---|
| 3,802,780 | 4/1974 | Helm et al. | 356/141 |
| 3,989,942 | 11/1976 | Waddoups | 356/152 |
| 3,991,318 | 11/1976 | Duguay | 250/578 |
| 4,128,759 | 12/1978 | Hunt et al. | 350/96.13 |

FOREIGN PATENT DOCUMENTS

| | | |
|---|---|---|
| 1273835 | 7/1968 | Fed. Rep. of Germany . |
| 2266893 | 10/1975 | France . |
| 2293714 | 7/1976 | France . |

*Primary Examiner*—S. C. Buczinski
*Attorney, Agent, or Firm*—Sughrue, Mion, Zinn, Macpeak and Seas

[57] ABSTRACT

In a system for tracking a target which is illuminated by a laser beam, for example, apparatus is required to determine how far the target is off-axis. The apparatus includes an objective lens (3) which concentrates light coming from the target onto a reception surface (8). A group (12) of bundles (13,14,15,16) of optical wave guides is disposed between the reception surface (8) and a single photoelectric receiver (21). Each bundle conveys light from a respective portion of the reception surface. The bundles (13,14,15,16) of wave guides are of different lengths. Thus, the optical signals transmitted by the various bundles are received successively by the single receiver. This avoids problems of matching the sensitivity of different receivers responsive to different portions of the reception surface.

8 Claims, 6 Drawing Figures

APPARATUS FOR DETERMINING THE ANGULAR POSITION OF A TARGET ILLUMINATED BY LIGHT PULSES

The present invention relates to apparatus for determining the angular position of a target illuminated by light pulses. It relates, in particular, to such apparatus of the type which includes an objective lens means capable of concentrating light from the illuminated target onto a reception surface so as to form a light spot on said surface when the target is illuminated by a light pulse;

a system for receiving said light spot, said system including a photoelectric receiver; and an electric circuit connected to the output of the photo-electric receiver to generate signals which are representative of the position of the light spot on the reception surface.

BACKGROUND OF THE INVENTION

In known apparatus of this type, the receiver is a "four-quadrant receiver" i.e. it is formed by four optically and electrically independent components whose sensitive surfaces or quadrants are juxtaposed along two mutually perpendicular axes in the focal plane of the lens means. This receiver has four electric outputs connected to an electric circuit which transforms the data delivered by the receiver into electric signals that are representative of the position of the image of the target relative to said perpendicular axes, whereby the signals are representative of the angular position of the target relative to the axis of the lens means, the orientation of this axis being known. In practice, the image is sufficiently large to cover at least part of all four quadrants and the signals delivered by the receiver are generated by comparing the light energy received by each quadrant.

The disadvantage of this apparatus is that it requires the four receiver components to be equally sensitive so as to obtain a suitably linear response from the electric circuit, even under severe environmental conditions such as those required for military equipment. In practice, this requirement is very difficult to meet and to try to do so as far as possible, low-sensitivity types of photoelectric receiver have had to be used.

Preferred embodiments of the present invention provide apparatus which is both robust and more accurate in determining the angular position of a target illuminated by light pulses.

SUMMARY OF THE INVENTION

The present invention provides apparatus of the type defined wherein the reception system includes a group of n bundles of optical wave guides with the wave guides which form part of the same bundle being all of the same length, while the different bundles are of different lengths so as to form a sequence of predetermined lengths. The input surfaces of the wave guides of each nest are disposed side by side and facing respectively n predetermined portions of the reception surface so that the wave guides of the n bundles transmit light pulses from said spot. The output surfaces of the wave guides are disposed so that the pulses caused by light from said spot act on the photoelectric receiver in a time sequence which is representative of said sequence of predetermined lengths, whereby the photoelectric receiver delivers, in operation, successive electric pulses whose amplitudes are representative of the illumination of respective portions of the reception surface by the spot.

BRIEF DESCRIPTION OF THE DRAWINGS

Particular embodiments of the present invention are described hereinbelow by way of example with reference to the accompanying drawings in which.

DESCRIPTION OF PREFERRED EMBODIMENTS

Figure 1:
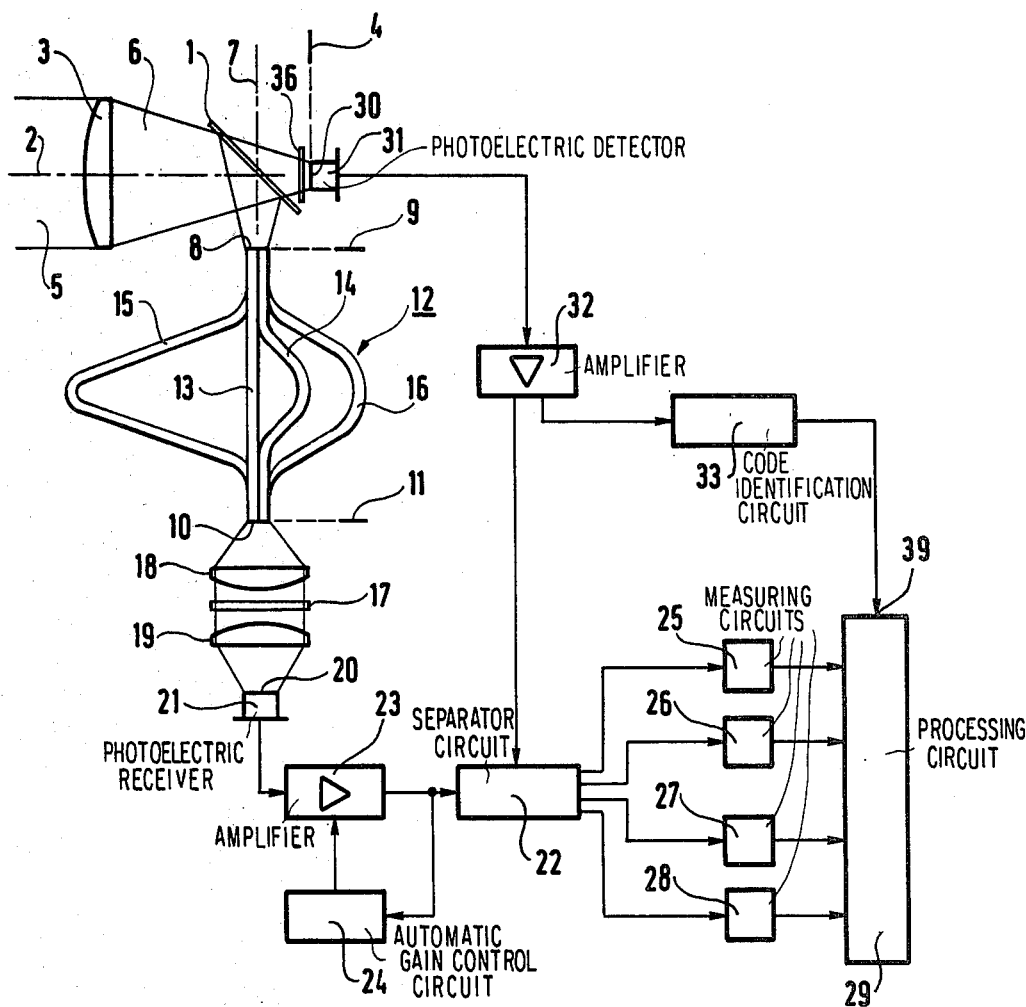
FIG. 1 illustrates schematically one embodiment of apparatus in accordance with the invention.

In FIG. 1, a partially transparent reflector 1 is disposed at 45 degrees to the axis 2 of an objective lens 3, between said lens and a plane 4 perpendicular to the axis 2. The objective lens 3 receives a light beam 5 such as a laser beam, said light beam coming from remote points situated in its field of reception. After passing through the lens 3, the beam 5 forms a convergent beam 6 which is divided into two parts by the reflector 1. Part of the energy of the beam 6 is concentrated on a reception surface 8 after being reflected by the reflector 1 along an axis 7 perpendicular to the axis 2. Said reception surface 8 is situated in a plane 9 perpendicular to the axis 7.

Four bundles 13,14,15 and 16 of optical wave guides, e.g. optical fibers, are disposed between the reception surface 8 and another surface 10 situated in a plane 11 parallel to plane 9. Said bundles are referred to collectively as a group 12. Each bundle comprises a plurality of optical fibers of same length disposed in parallel. At one end of the bundle, the fibers are pressed tight against one another so that their end surfaces are disposed in a plane to form a light input surface which is a sector of a circle with an angle of 90 degrees at its center.

The light input surfaces of the four bundles are placed next to one another in the plane 9 and are applied against the reception surface 8 to cover it completely.

Figure 2:
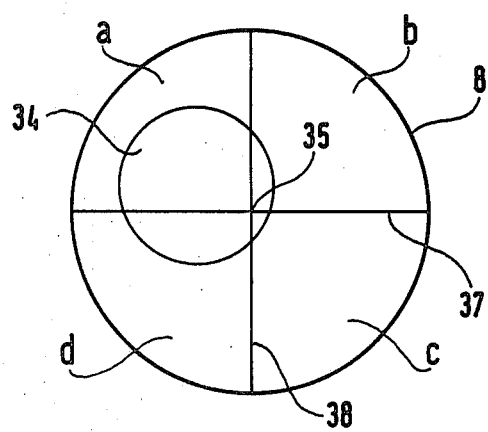
FIG. 2 is a plan view which illustrates the image of a target on the reception surface of apparatus of FIG. 1, said surface being sub-divided into four portions.

FIG. 2 shows that everything happens as if the reception surface 8 were divided into four equal portions a, b, c, d by two axes 37, 38 at right angles to each other intersecting at the axis 7, with each of said four portions corresponding to a respective one of the four input surfaces of the four bundles.

Figure 3:
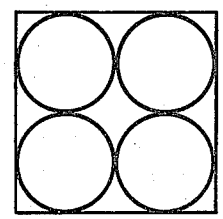
FIGS. 3 and 4 are plan views which show other ways of sub-dividing the reception surface of apparatus in accordance with the invention.
Figure 4:
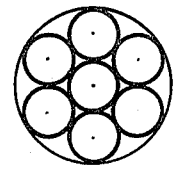

Of course, the reception surface 8 could be divided in a different way from that illustrated in FIG. 2. For example, FIG. 3 shows that the reception surface could include four portions delimited by four equal circles which are tangential to one another, the overall surface being substantially square. Likewise there could be more or fewer than four bundles of optical wave guides and of corresponding portions of the reception surface; for example, there could be seven circular portions arranged in the disposition illustrated in FIG. 4, with the overall reception surface being substantially circular.

The bundles of wave guides are of different lengths in a sequence of predetermined values, the difference between two successive lengths being constant, for example.

The ends of the fibers in the group 12 which are distant from the input surfaces are pressed tight against one another so that their end surfaces from a light output surface in the plane 10.

Some bundles can have relatively long fibers e.g. several meters long. To make the group 12 of bundles of differing lengths as compact as possible, the following disposition, for example, can be used: the shortest bundle 13 extends along a straight line between the input and output planes 9 and 11 while the other bundles 14, 15 and 16 are wound about the shortest bundle 13.

The output surface 10 can be directly disposed against the sensitive surface of a photoelectric receiver. However, in general, this sensitive surface is smaller than the surface 10, so it is preferable to use an optical system constituted by two lenses 18 and 19 to form the image of the surface 10 on the sensitive surface 20 of a photoelectric receiver 21. This photoelectric receiver may be an avalanche photodiode for example. An optical filter 17 is disposed between lenses 18 and 19.

The electric output of the receiver 21 is connected to a separator circuit 22 via an amplifier 23. An automatic gain-control circuit 24 is connected to control the gain of the amplifier 23 as a function of the signal present at its output. The separator circuit 22 has four outputs connected respectively to four measuring circuits 25, 26, 27 and 28. The outputs of the four measuring circuits are connected respectively to a processing circuit 29.

The part of the convergent beam 6 which is not reflected towards the receiving surface 8 passes through the partially transparent reflector 1 without being deflected, and is concentrated onto the sensitive surface 30 of a photoelectric detector 31 after passing through an optical filter 36. Said detector is disposed in the plane 4 and is of the same type as the photoelectric receiver 21.

The electrical output from the detector 31 is connected via an amplifier 32 to the separator circuit 22 and to a code identification circuit 33. The code identification circuit 33 has an output connected to a control input 39 of the processing circuit 29.

Of course, in a variant of the apparatus illustrated in FIG. 1, it is possible to interchange the roles of the direct and the deflected beams with the input surfaces of the optical fibers lying in the plane 4 in the place of the detector 31, and with the sensitive surface of the detector 31 lying in the plane 9 in place of the input surfaces of the optical fibers.

The apparatus described hereinabove with reference to FIGS. 1 and 2 operates as follows.

The axis 2 of the objective lens 3 is directed so as to bring the target into the reception field of the objective lens 3, e.g. by means of a sighting telescope (not shown) whose axis is parallel to the axis 2.

With the target illuminated by a laser pulse, a light spot 34 appears on the surface 8 (see FIG. 2). It is seen that this spot, which is supposed to be circular, is shifted relative to the point 35 of intersection of the perpendicular axes 37 and 38. Each of the portions a, b, c, and d of the surface 8 receives an amount of laser energy different from that received by the other portions. The four bundles therefore transmit different amounts of laser energy with the amount transmitted by any one bundle being a function of the area of that part of the spot 34 which is on the portion of the reception surface 8 occupied by the bundle in question.

Further, the time taken by the laser energy transmitted by the four bundles of fibers to go from plane 9 to plane 11 is different for each bundle of fibers, since these bundles of fibers are of different lengths.

Therefore, for each light spot formed on the surface 8, the surface 10 receives a sequence of four laser pulses shifted in time as a function of the fiber lengths of the four bundles.

The optical system 18, 19 transmits these four laser pulses onto the sensitive surface 20 of the receiver 21. Although not shown in the drawing in practice the axial length of the optical system 18, 19 is negligible compared with the lengths of the fibers. The filter 17 only passes a narrow frequency band of light centered on the frequency of the laser pulse light which illuminates the target.

The amplitudes of the electric pulses delivered by the receiver 21 in response to the four laser pulses are representative of the laser energy transmitted by each bundle of fibers.

Figure 5:
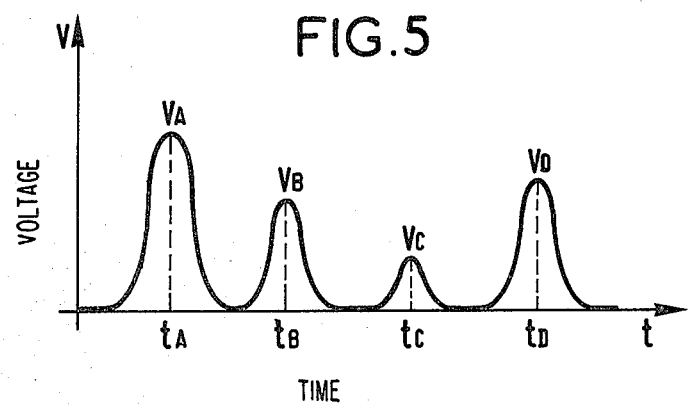
FIG. 5 is a plot for explaining operation of the apparatus illustrated in FIGS. 1 and 2.

The diagram of FIG. 5 represents the four electric pulses. In this diagram, amplitude V is plotted along the Y-axis and time T is plotted along the X-axis. It is seen that the four pulses A,B,C, and D transmitted respectively by the bundles 13, 14, 16 and 15 reach the receiver 21 at the ends of the periods $t_A$, $t_B$, $t_C$ and $T_D$ which are proportional to the fiber lengths of the bundles. Further, the amplitudes $V_A$, $V_B$, $V_C$ and $V_D$ of the electric pulses are substantially proportional to the area that the spot 34 covers in each of the four portions a, b, c and d of the reception surface 8, (FIG. 2).

The four electric pulses therefore reach the input of the separator circuit 22 after passing through the amplifier 23. The automatic gain-control circuit 24 of known type serves to maintain the average amplitude of pulses leaving the amplifier 23 at a constant level which is independent of the (very variable) level of energy received from the target. Naturally, the response time of the A.G.C. circuit 24 is slow in comparison to the spread of times $t_A$ to $t_D$ taken by any one target reflected spot to pass through the system.

The filter 36, analogous to the filter 17, eliminates radiation of different frequency from the laser pulses. For each laser pulse which illuminates the target, the detector 31 delivers an electric synchronisation pulse which is not shifted in time like those emitted by the receiver 21. This synchronisation pulse constitutes a time reference mark for the four electric pulses received at the input of the separator circuit 22. The separator circuit 22 delivers the four electric pulses which result from a light spot formed on the surface 8 at respective ones of its four outputs. This separator circuit can be of a type analogous to demultiplexer circuits known in the field of telecommunications.

The outputs of the measuring circuits 25, 26, 27 and 28 deliver respective signals which are representative of the amplitudes of the four electric pulses.

Circuits 25 to 28 send measuring signals to the processing circuit 29 which in turn generates signals representative of the position of the spot 34 on the surface 8 (FIG. 2). For example, the circuit 29 can add respective pairs of signals coming from the portions a and b, c and d, a and d, b and c. Comparing the signals which correspond "a+b" and "c+d" gives a signal which is representative of the position of the spot 34 relative to horizontal axis 37 (FIG. 2) of the surface 8. Likewise, comparing the signals which correspond to a+d and b+c gives a signal which is representative of the position of the spot 34 relative to vertical axis 38 (FIG. 2) of the surface 8.

The processing circuit 29 may also include a gate at each of its four inputs. Each such gate is controlled by the control input 39 of the circuit 29.

The code identification circuit 33 receives amplified electric pulses from the detector 31 and its output does not deliver a gate opening signal to the circuit 29 until these electric pulses are emitted in a predetermined code. Said code serves to distinguish between different laser pulses on the same terrain and, for example, can be a pulse repetition frequency code. The circuit 33 then measures the frequency of the electric pulses it receives and delivers an opening signal only if this frequency corresponds to a predetermined value. The circuit 33 delivers a gate inhibit signal as long as the frequency of the electric pulses delivered by the detector 31 is different from said predetermined value.

Figure 6:
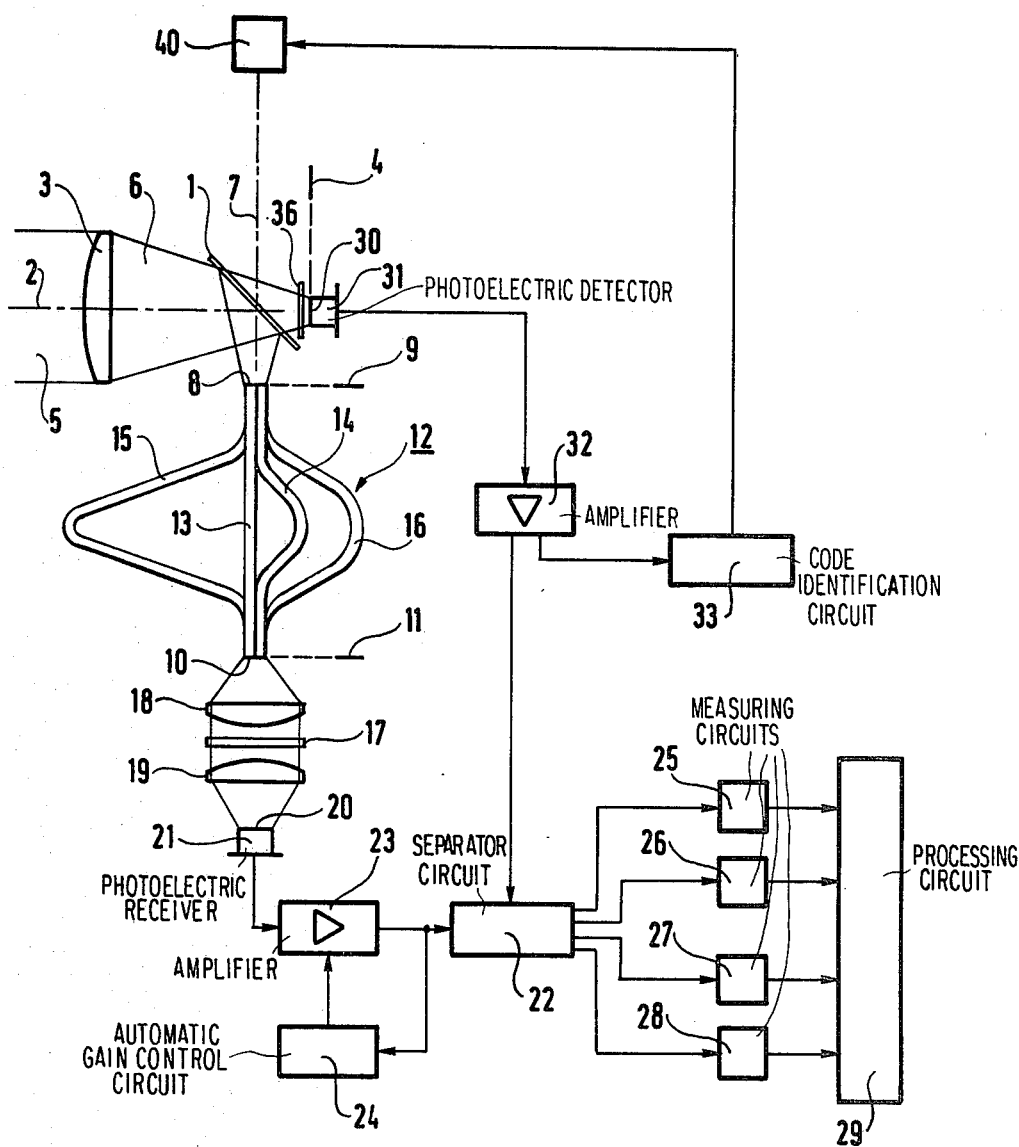
FIG. 6 illustrates a variant of apparatus in accordance with the invention.

Many components of the apparatus illustrated in FIG. 6 are analogous to those illustrated in FIG. 1, and analogous components are designated by the same reference. However, in the apparatus illustrated in FIG. 6, there is no longer an electrical connection between the code identification circuit 33 and the processing circuit 29. In contrast, an electromagnetic system 40 is connected to the output of the circuit 33. It serves to place the reflector 1 on the path of the beam 6 only when the input of the circuit 33 receives pulses emitted in the predetermined code, the system 40 maintaining the reflector 1 outside the path of the beam 6 as long as the pulses received by the circuit 33 are emitted in a code different from the predetermined code.

The advantage of this variant is that it is able to search for the target by directing all of the light energy which passes through the objective 3 onto the detector 31, thereby increasing the sensitivity of the apparatus.

The apparatus in accordance with the invention has several advantages. In particular, in said apparatus, the light pulses whose amplitudes make it possible to determine the position of the target image on the reception surface are separated in time and are received on a single receiver which delivers electric pulses amplified by a single amplifier. This eliminates any relative variation of sensitivities between the various four-quadrant receivers of the prior art. Further automatic gain-control can be applied to the amplifier 23 since it affects all the signals identically and therefore does into cause any relative variation of sensitivity.

The single receiver 21 may be an avalanche diode in which case sensitivity is high compared with photoelectric receivers used in prior art apparatus. The gain in sensitivity can be as much as 100 times. Indeed, in practice, avalanche diodes are not used in four-quadrant receivers because it would be difficult to find four such receivers with identical response curves.

The distortion caused by the mutual influence of the various portions of the reception surfaces of four-quadrant receivers is practically cancelled.

The external shape of the reception surface (circular, square or rectangular) can be determined in accordance with particular requirements by varying the configuration of the group of optical fiber bundles. Indeed, it should be noted that the external shape of the output surface 10 of the group of bundles could be different from that of the input surface 8, and it could lie in some quite different plane such that the disposition of the photoelectric receiver 21 is chosen as a function of available space rather than being determined by the position of the objective lens.

The apparatus in accordance with the invention can be applied to a system for tracking a target illuminated by a laser.

We claim:

1. Apparatus for determining the angular position of a target which is illuminated by light pulses, said apparatus including:

objective lens means for concentrating light from the illuminated target onto a reception surface so as to form a light spot on said surface when the target is illuminated by a light pulse;

a system for receiving said light spot, said system including a photoelectric receiver; and an electric circuit connected to the output of the photo-electric receiver to generate signals which are representative of the position of the light spot on the reception surface;

the improvement wherein the receiving system includes:

a group of n bundles of optical wave guides with the wave guides which form part of the same bundle being all of the same length, and said bundles being of different lengths so as to form a sequence of predetermined lengths, the input surfaces of the wave guides of each bundle being disposed side by side and facing n respective predetermined portions of the reception surface so that the wave guides of the n bundles transmit light pulses from said spot, the output surfaces of the wave guides being disposed so that the pulses caused by light from said spot act on the same photoelectric receiver in a time sequence which is representative of said sequence of predetermined lengths, whereby the photoelectric receiver delivers, in operation, successive electric pulses whose amplitudes are representative of the illumination of respective portions of the reception surface by the spot, and wherein said electric circuit includes:

a separator circuit whose input is connected to the output of the photoelectric receiver, said separator circuit including n outputs to deliver respectives ones of said successive electric pulses corresponding to each light spot received on the reception surface;

n measuring circuits respectively connected to the n outputs of the separator circuit to deliver measuring signals which are representative of the amplitudes of respective ones of the successive electric pulses; and a processing circuit connected to the outputs of the n measuring circuits to transform the measuring signals into signals which are representative of the position of the light spot on the reception surface.

2. Apparatus according to claim 1, wherein the reception system further includes an optical system disposed between the output surfaces of the wave guides and the sensitive surface of the photoelectric receiver to form an image of the output surfaces on said sensitive surface.

3. Apparatus according to claim 1, further including:
   a photoelectric detector disposed to receive at least part of the light which passes through the objective lens means to deliver a synchronization signal each time a light pulse is received, and said photoelectric detector having an output connected to said separator circuit to apply said synchronization signal thereto.

4. Apparatus according to claim 3, further including at least one optical filter arranged to pass received light to the receiver and to the detector only when said received light is in a frequency band centered on the frequency of the light of the light pulses, said light being monochromatic.

5. Apparatus according to claim 3, further including a code identification circuit whose input is connected to the electric output of the detector, the code identification circuit being connected to said processing circuit to inhibit said electric signals as long as the light pulses received by the detector do not correspond to a predetermined code.

6. Apparatus according to claim 5, wherein the detector is disposed to receive all the light which passes through the objective lens means as long as the light pulses do not correspond to the predetermined code such that the photoelectric receiver then receives no light thereby inhibiting said electric signals, and wherein the apparatus further includes reflector-moving means controlled by said code identification circuit to move a partially transparent reflector into a position between the objective lens means and the detector in which said reflector directs some of the light which passes through the objective lens means towards the reception surface, and means for actuating said reflector-moving means to move said reflector into said position as soon as the light pulses received by the detector correspond to the predetermined code.

7. Apparatus according to claim 5, further including a partially transparent reflector disposed to separate the beam which passes through the objective lens means into two parts, one of which is directed towards the reception surface and the other of which is directed towards the detector, and means for connecting the output of the code identification circuit to the processing circuit so as to inhibit the electric signals as long as the light pulses received on the detector do not correspond to the predetermined code.

8. Apparatus according to claim 1, wherein the electric circuit further includes an amplifier connected between the output of the photoelectric receiver and the separator circuit, and an automatic circuit to control the gain of said amplifier.

* * * * *